United States Patent
Uchida et al.

(10) Patent No.: US 7,883,756 B2
(45) Date of Patent: *Feb. 8, 2011

(54) OPTICAL INFORMATION RECORDING MEDIUM

(75) Inventors: Mamoru Uchida, Gunma (JP); Tomonori Endo, Gunma (JP); Yuaki Shin, Gunma (JP); Yoshimasa Shimomura, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 11/725,367

(22) Filed: Mar. 19, 2007

(65) Prior Publication Data

US 2007/0248776 A1 Oct. 25, 2007

(30) Foreign Application Priority Data

Mar. 20, 2006 (JP) ............................. 2006-075951

(51) Int. Cl.
B32B 3/02 (2006.01)

(52) U.S. Cl. ................. 428/64.1; 428/64.4; 430/270.11

(58) Field of Classification Search ........................ None
See application file for complete search history.

(56) References Cited

U.S. PATENT DOCUMENTS

2004/0167025 A1* 8/2004 Usami ......................... 503/201
2005/0064114 A1* 3/2005 Matsubaguchi et al. .. 428/32.24
2005/0186331 A1* 8/2005 Fujimoto et al. .............. 427/66
2006/0204705 A1* 9/2006 Uchida et al. ............... 428/64.4
2007/0248775 A1* 10/2007 Uchida et al. ............ 428/32.31

FOREIGN PATENT DOCUMENTS

| EP | 1519369 A1 | 3/2005 |
| JP | 2002-237103 | 8/2002 |
| JP | 2003-011489 | 1/2003 |
| JP | 2003-059112 | 2/2003 |
| JP | 2005-093015 | 4/2005 |

OTHER PUBLICATIONS

Co-pending U.S. Appl. No. 11/725,274, filed Mar. 19, 2007.

* cited by examiner

*Primary Examiner*—Elizabeth Mulvaney
(74) *Attorney, Agent, or Firm*—Law Office of Katsuhiro Arai

(57) ABSTRACT

One inventive aspect relates to an optical information recording medium, in which the quality of a printed image is not impaired because the water resistance of a printed portion is improved. The optical information recording medium includes a porous film ink receiving layer as an outermost layer of a surface opposite to a recording and playback surface, wherein when the ink receiving layer is printed with an ink of each of four colors, cyan, magenta, yellow, and black, followed by drying, a running water test is performed, and $L^*a^*b^*$ values before and after the running water test are measured with a colorimeter, the total value of the square root of the sum of the square of difference in $L^*$, the square of difference in $a^*$, and the square of difference in $b^*$, each between before and after the running water test, of each of the four colors is approximately 20 or less.

11 Claims, 3 Drawing Sheets

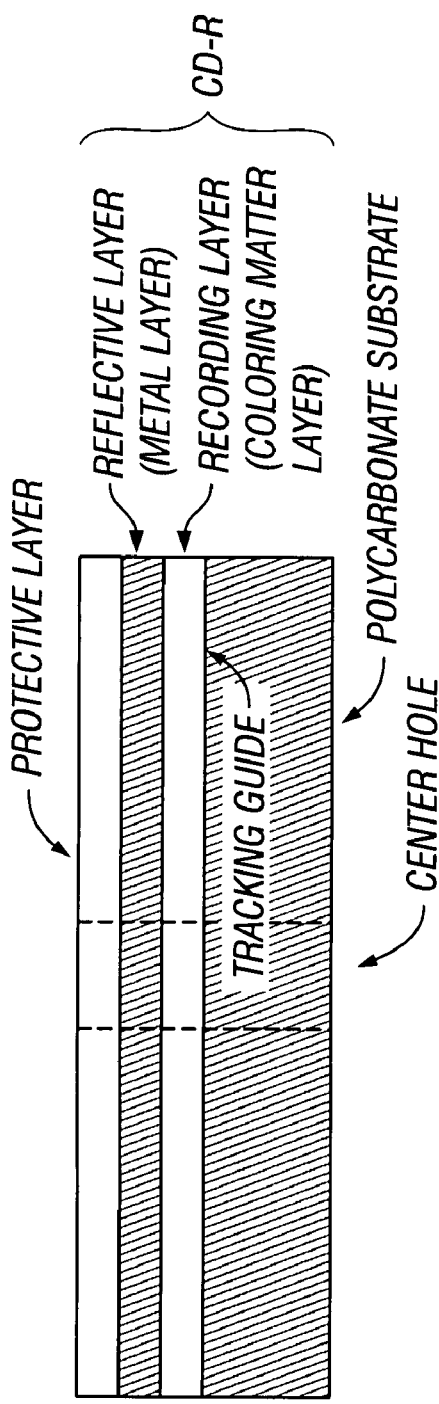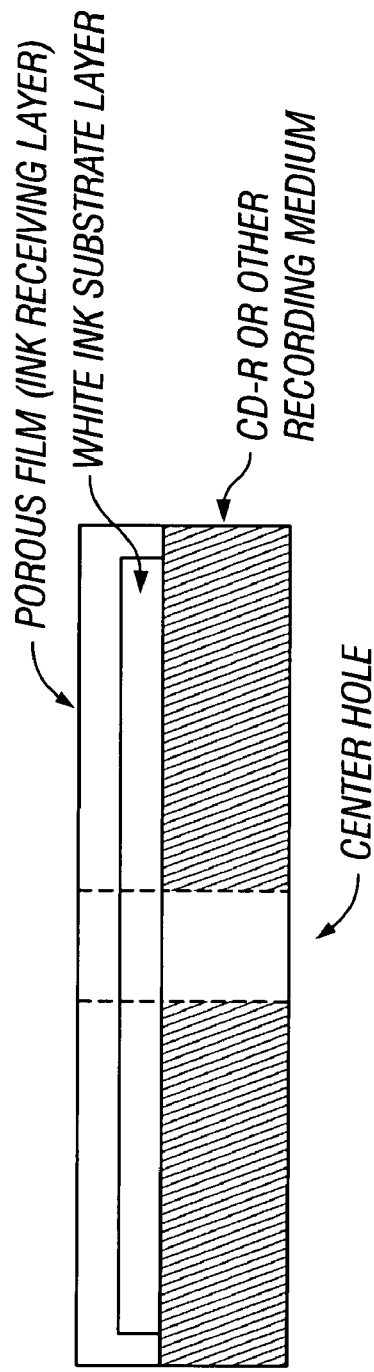

OPTICAL INFORMATION RECORDING MEDIUM

RELATED APPLICATIONS

This application is related to U.S. application Ser. No. 11/725,274, filed on the same day herewith and titled "OPTICAL INFORMATION RECORDING MEDIUM," which is hereby incorporated by reference.

BACKGROUND OF THE INVENTION

1. Field of the Invention

The present invention relates to an optical information recording medium exhibiting excellent print water resistance and having an ink receiving layer, which can be printed directly, on a surface (label surface) opposite to a recording and playback surface of the optical information recording medium.

2. Description of the Related Technology

A Medium having an ink receiving layer, which can be printed directly with an ink-jet printer or the like, on a label surface of an optical information recording medium (a so-called printable product) has become widely used.

Here, the ink receiving layer of the printable product is allowed to be printed with images and characters by absorbing and fixing a water based ink of an ink-jet printer. Therefore, in general, the layer is composed of a raw material primarily containing a hydrophilic resin. On the other hand, since the ink receiving layer has a hydrophilic function, there is a problem in that the water resistance is poor.

In contrast to the case where printing is performed on common paper or the like, since the printable product has two functions including a printing function and a function as an optical information recording medium, usually, the printable product is handled in such a way as to avoid touching directly the recording and playback surface side with a finger or the like in order that the function as an optical information recording medium does not deteriorate. That is, opportunities to handle while touching a surface (a label surface) opposite to the recording and playback surface are increased, and the improvement of the durability of a printed surface has become an even more important factor as compared with that in the case where printing is performed on paper or the like.

The invention related to "an optical recording medium including a printing receiving layer as an outermost layer of the medium, wherein the printing receiving layer is formed from an ultraviolet curing resin composition containing fine particles having an average particle diameter of 200 nm or less and a cationic resin" has been known as the optical information recording medium having an ink receiving layer exhibiting excellent print water resistance (refer to Japanese Unexamined Patent Application Publication No. 2000-57635).

In this invention, with respect to the water resistance of the image, solid printing is performed with different two colors, A and B, selected from four colors of cyan, magenta, yellow, and black (the combinations of the color A and the color B are 12 types), after 1 hour, about 1 cc of water is dropped on the image portion, standing is performed at room temperature for 1 minute, wiping is performed with a clean room wiper, a state of elution of the ink of the image portion is evaluated visually, and it is ascertained that the ink is not eluted, nor occurs change in the color (paragraph [0058]). However, since the printing receiving layer (ink receiving layer) primarily contains the ultraviolet curing resin composition, it may not be said that the water resistance of the ink receiving layer is satisfactory.

On the other hand, as a trend in the printable product market, printable products having a gloss have become appeared. The ink receiving layer is allowed to have a function of gloss so as to become upscale-looking. This product has a high level of gloss superior to that of known printable products.

In association with this, the invention related to "an optical recording medium including an ink absorption resin layer as an outermost layer having a 60-degree specular glossiness of the surface of 30 or more, and 150 or less" has been known (refer to Japanese Unexamined Patent Application Publication No. 2002-237103).

However, the water resistance of these products are the same level as the level of the known product, and the color tends to fade.

There is also a product of the type, in which highly water-resistant paper (so-called water-resistant photo paper) is attached to a label surface. The durable image quality is realized by attaching the paper (image) printed with a printer or the like to the label surface.

As described above, there is an effort afoot to improve an upscale image and functions, e.g., durability, of the printable products.

When printing is performed on the durable photo paper, high quality printing exhibiting durability after the printing can be realized. However, there is a problem in that functions (optical recording and playback) as an optical information recording medium tend to be impaired significantly. Specifically, the deflection in rotation tends to occur due to misalignment in attachment of a label, accuracy in the weight distribution of paper itself, or the like. Furthermore, warpage tends to occur due to deformation (expansion, shrinkage, or the like) of the label itself. These tend to cause errors during recording or playback. Moreover, there is a risk that the attached label begins peeling or is peeled off. In this case, the label may get snagged on a drive device so as to cause breakage of disk or drive.

Consequently, with respect to the printable product, in which an ink receiving layer is disposed directly on a label surface of an optical information recording medium without attaching water-resistant photo paper, a technology to ensure high durability is required in order that the color of the image or character after printing is not easily faded even when being rubbed.

SUMMARY OF CERTAIN INVENTIVE ASPECTS

It is an object of certain inventive aspects to solve the above-described problem in that with respect to an ink receiving layer disposed directly on an optical information recording medium, the water resistance function after printing is inadequate, and when a label surface is touched with a finger or the like during handling, the print quality may be impaired, for example, the color may be faded, and to provide an optical information recording medium, in which the water resistance of a printed portion is improved and, thereby, the quality of a printed image is not impaired.

In order to achieve the above-described object, the following devices are adopted:

(1) An optical information recording medium including a porous film ink receiving layer as an outermost layer of a surface opposite to a recording and playback surface, wherein when the above-described ink receiving layer is printed with an ink of each of four colors, cyan, magenta, yellow, and black, followed by drying, a running water test, in which running water is poured on a printed portion at a rate of 6 liter/min for 1 minute at 20° C., is performed, and L*a*b* values before and after the running water test are measured with a calorimeter, the total value of the square root of the sum of the square of difference in L*, the square of difference in a*, and the square of difference in b*, each between before and after the running water test, of each of four colors, cyan, magenta, yellow, and black, is 20 or less;

(2) The optical information recording medium according to the above-described item (1), wherein the above-described porous film is a coating film primarily containing an inorganic powder;

(3) The optical information recording medium according to the above-described item (2), wherein the above-described coating film is produced by bonding a gas phase method inorganic powder with a resin binder;

(4) The optical information recording medium according to the above-described item (2) or item (3), wherein the above-described coating film is formed by a spin coating method; and (5) The optical information recording medium according to any one of the above-described items (1) to (4), wherein the above-described ink receiving layer is disposed in the above-described optical information recording medium by forming a white ink substrate layer on the surface of a protective layer of the recording medium main body.

The L*a*b* values are measured with a colorimeter (CR-300 produced by Konica Minolta, Inc.) on the basis of JIS Z 8729. JIS Z 8729 is hereby incorporated by reference in its entirety. This standard defines a method of indicating material color using L*a*b* color specification which is a three-dimensional proximate equal color space proposed by Commission Internationale de l'Eclairage, CIE in 1976, which space is known as CIE(1976)L*a*b* color space, abbreviated as CIELAB.

Solid circles of four colors of cyan, magenta, yellow, and black (CMYK) are printed in accordance with a printing pattern (refer to FIG. 1). After drying was performed adequately by standing for 24 hours or more, running water is poured on a printed portion (6 liter/min, 1 minute, 20° C.). FIG. 2 schematically shows the manner of the test in which running water is poured on a printed optical information recording medium (disk). In FIG. 2, the structure includes a guide as an upper portion for uniformly pouring running water on the disk surface at an angle of 60 degrees, and arrows indicate the flow of the running water.

The L*a*b* values of the printed portion of solid circles are measured, and the square root of the sum of the square of difference in L*, the square of difference in a*, and the square of difference in b*, each between before and after the running water test, of each color is determined (refer to Calculation formula (a)). The total value of the above-described value for each of the colors CMYK is determined (refer to Calculation formula (b)).

$L*a*b*$ value before running water test=$(L*_b, a*_b, b*_b)$ $L*a*b*$ value after running water test=$(L*_a, a*_a, b*_a)$ difference ($X$) between before and after running water test=$\sqrt{((L*_b - L*_a) \times (L*_b - L*_a) + (a*_b - a*_a) \times (a*_b - a*_a) + (b*_b - b*_a) \times (b*_b - b*_a))}$ (a)

Calculation formula=$X$(Cyan)+$X$(Magenta)+$X$(Yellow)+$X$(Black) (b)

Printers used for evaluation are five types of EPSON (PMG800), Canon (PIXUS990i), Rimage (480i), Bicro-Boards (PrintFactory), and Primera (SignatureIV), and printing modes are set at a high image quality compatible CD/DVD mode (PMG800), a recommended printable (PIXUS990i), BEST (480i), PhotoBEST (PrintFactory), and BEST600 (SignatureIV), respectively.

When the color fading in the running water test after the printing is specified to be 20 or less in terms of a value based on the color difference between before and after the running water test, the water resistance of the printed portion may be maintained satisfactorily and highly durable print quality may be ensured.

BRIEF DESCRIPTION OF THE DRAWINGS

FIG. 3 is a diagram showing a basic structure of a CD-R to which an ink absorption layer according to an aspect of the present invention is applied.

FIG. 4 is a diagram showing a basic structure of an optical information recording medium according to an aspect of the present invention.

DESCRIPTION OF CERTAIN ILLUSTRATIVE EMBODIMENTS

Figure 1:
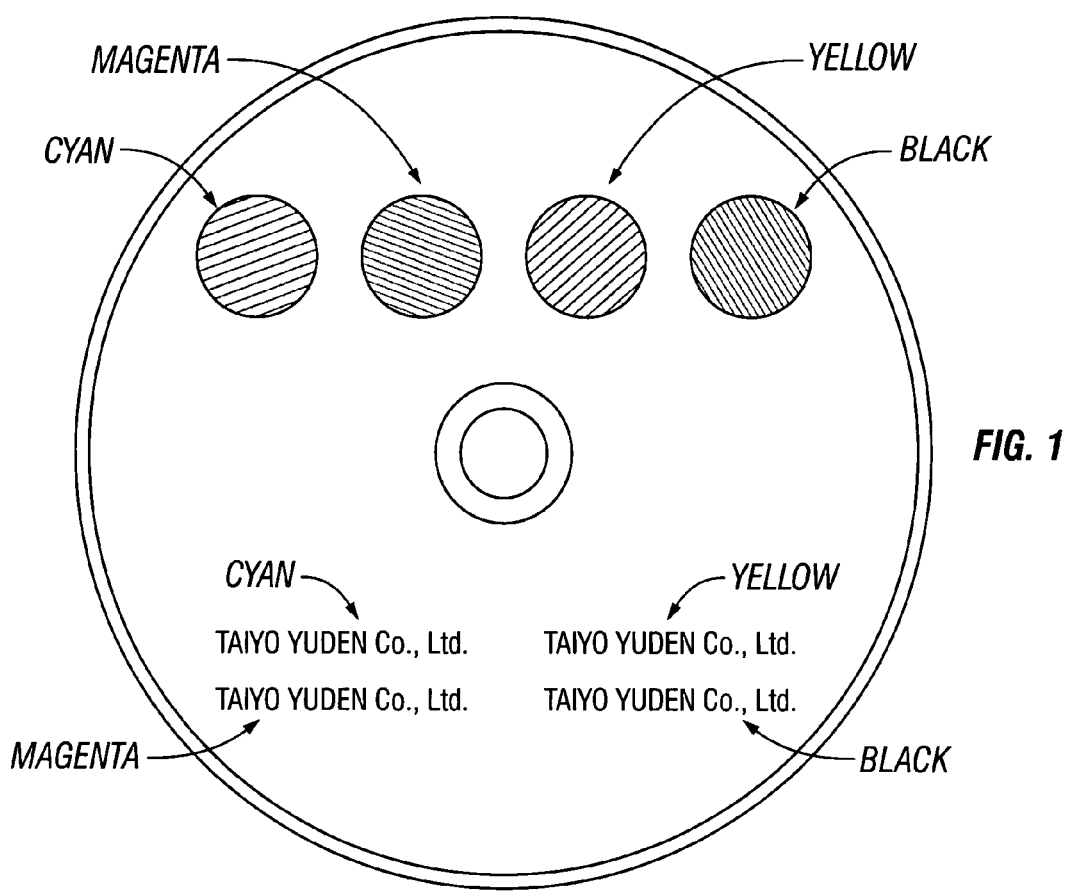
FIG. 1 is a diagram showing a printing pattern for measuring the color difference in the printing performed by using ink-jet printers.
Figure 2:
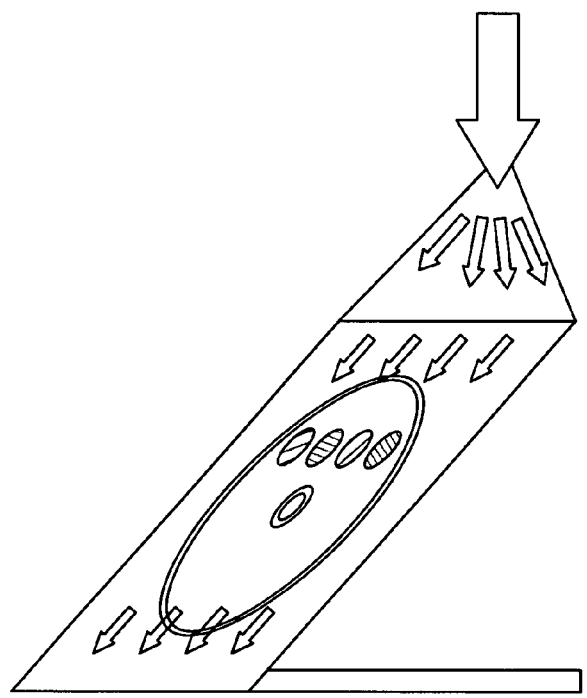
FIG. 2 is a diagram schematically showing the manner of the test in which running water is poured on a printed optical information recording medium (disk).

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details.

FIG. 3 is a diagram showing a basic structure of a CD-R to which an ink absorption layer according to an aspect of the present invention is applied.

A tracking guide is disposed on a light-transmissive polycarbonate substrate, a recording layer composed of a coloring matter, e.g., cyanine, is disposed on the surface provided with the tracking guide, a reflective layer composed of a metal, e.g., silver, is disposed thereon and, subsequently, a protective layer composed of an ultraviolet curing resin or the like is disposed.

FIG. 4 shows a basic structure of an optical information recording medium according to an aspect of the present invention.

A white ink substrate layer is disposed on a recording medium main body, e.g., CD-R, having the above-described structure, and a porous film ink receiving layer is disposed thereon.

In the basic structure of the DVD-R, to which the ink absorption layer is applied, polycarbonate substrates having a thickness of 0.6 mm are bonded together. In an aspect of the present invention, the white ink substrate layer is disposed on the polycarbonate substrate on the side where the recording layer is not disposed. That is, the CD-R, to which the ink absorption layer according to an aspect of the present invention is applied, includes the protective layer under the white ink substrate layer, whereas in the DVD-R, the polycarbonate substrate is disposed under the white ink substrate layer and has a function as a protective layer.

The ink receiving layer according to an aspect of the present invention is characterized in that when printing is performed with an ink of each of four colors, cyan, magenta, yellow, and black, followed by drying, a running water test, in which running water is poured on a printed portion at a rate of 6 liter/min for 1 minute at 20° C., is performed, and $L*a*b*$ values before and after the running water test are measured with a calorimeter, the total value of the square root of the sum of the square of difference in $L*$, the square of difference in $a*$, and the square of difference in $b*$, each between before and after the above-described running water test, of each of four colors, cyan, magenta, yellow, and black, (hereafter referred to as "a color difference between before and after the running water test") is 20 or less.

If the above-described value exceeds 20, since the amount of ink, which flows out due to the running water, is increased, the print water resistance deteriorates and, for example, when the printed surface portion is rubbed with a wet hand, unfavorably, rubbing marks may be left and color fading of the ink may occur.

It is more preferable that the above-described value is specified to be 15 or less because the print water resistance is ensured.

In one embodiment, it is preferable that the porous film constituting the ink receiving layer is a coating film, which primarily contains an inorganic powder and in which the inorganic binder is bonded with a resin binder or the like. In particular, preferably, it is a coating film in which a gas phase method inorganic powder, e.g., a gas phase method alumina powder, is bonded with a resin binder.

The gas phase method alumina is an alumina powder produced by vaporizing aluminum chloride or metal aluminum and oxidizing this by an oxidizing gas in a gas phase. Gas phase method inorganic powders can be produced from other inorganic materials, e.g., silica, in a manner similar to that described above.

The viscosity of a coating solution containing the gas phase method alumina powder (gas phase method inorganic powder) can be increased as compared with the viscosity of a coating solution containing common wet method alumina (water based inorganic powder). Consequently, the thickness of a coating film by a spin coating method or the like can be increased, and the glossiness and the water resistance of the ink receiving layer surface can be controlled by adjusting the thickness of the porous film.

The glossiness and the water resistance of the ink receiving layer surface can also be controlled by adjusting the particle size of the inorganic powder, e.g., a gas phase method inorganic powder. The particle size (primary particle diameter) of the inorganic powder may be 0.005 to 0.2 μm.

If the particle size is less than 0.005 μm, gaps of the porous film tend to be filled with fine particles and, thereby, there is a problem in that the ink absorption property is reduced. If the particle size exceeds 0.2 μm, the light passing through the porous film tends to scatter, the transparency of the porous film may be impaired and, thereby, the printing performance (color forming property) may be reduced. Therefore, the above-described range is preferable.

Examples of resin binders for bonding the inorganic powder include polyvinyl alcohol, polyethylene oxide, polyvinyl methyl ether, hydroxyethyl cellulose, and carboxymethyl cellulose. Polyvinyl alcohol may be made into an aqueous solution, and the inorganic powder may be dispersed therein so as to prepare a coating solution.

Components, e.g., a zirconium compound, for improving the fixing property and other components may be added to the coating solution. Consequently, the water resistance of the ink receiving layer may be controlled.

In one embodiment, preferably, 400 to 2,000 parts by mass of inorganic powder is blended relative to 100 parts by mass of resin in the coating solution. If the amount of blending is less than the lower limit, gaps of the porous film tend to be filled with the resin and, thereby, there is a problem in that the ink absorption property is reduced. If the amount of blending exceeds the upper limit, the amount of resin for bonding the inorganic powder becomes small and, thereby, the porous film may become brittle.

Preferably, the viscosity of the coating solution is adjusted to be 500 to 10,000 mPa·s at 25° C. If the viscosity is less than the lower limit, it becomes difficult to form a porous film having a predetermined thickness and there is a problem in that the ink absorption property is reduced. If the viscosity exceeds the upper limit, poor coating may occur, for example, the coating solution may not be spread over the disk during coating.

Preferably, the thickness of the coating film formed by applying the coating solution is 5 to 100 μm, and more preferably is 15 to 50 μm. If the film thickness is less than the lower limit, the ink may not be completely absorbed and poor printing, e.g., bleeding, may occur. If the film thickness exceeds the upper limit, the disk may be warped and, thereby, problems may occur in that, for example, errors tend to be caused and there is no economy because the usage of the coating solution is increased.

The water resistance of the ink receiving layer may be controlled within a desired scope by adjusting the content of the inorganic powder and the thickness of the coating film within the above-described range.

It is preferable that a substrate layer is disposed on the surface of the protective layer of the recording medium main body, e.g., CD-R, and the ink absorption layer (porous film) is formed thereon. In particular, when the substrate layer is composed of a white ink layer, the metal color of the layer under the substrate layer is concealed and the ground color becomes white. Therefore, the color forming property of the ink, which has reached passing through the porous film laminated on the surface, can be improved, so that a sharper image can be obtained.

Some examples of the optical information recording medium according to one embodiment will be described below.

Example 1

An aqueous solution was prepared by adding 1.0 part of 20-percent by weight nitric acid aqueous solution and 0.2 parts of lactic acid to 72.0 parts of 6-percent by weight polyvinyl alcohol (average degree of polymerization 5,000, average degree of saponification 88 percent by mole) aqueous solution. The resulting aqueous solution was blended with 25.8 parts of gas phase method alumina powder (Alu-C produced by NIPPON AEROSIL CO., LTD., primary particle diameter: 0.013 μm) while being shaken adequately, and dispersion was performed for 1 day in a ball mill including zirconia balls. Thereafter, 1.0 part of aqueous solution, in which 0.25 parts of zirconium oxychloride-octahydrate was dissolved, was added thereto, and dispersion was performed for 1 day in a ball mill, so that a coating solution A was obtained. The viscosity (measurement condition: VISCONIC EHD viscometer produced by Tokyo Keiki Co., Ltd., the number of revolutions of 100 rpm) of the resulting coating solution was 3,660 mPa·s at 25° C.

A light-transmissive polycarbonate substrate, in which a groove-shaped tracking guide having a half-width of 0.5 μm, a depth of 0.2 μm, and a track pitch of 1.6 μm was disposed in the range of diameter of 46 to 117 mm and which had an outer diameter of 120 mm, an inner diameter of 15 mm, and a thickness of 1.2 mm, was prepared.

A cyanine coloring matter dissolved in a solvent was applied by spin coating on the surface provided with the above-described tracking guide of this light-transmissive substrate, followed by drying, so as to form a recording layer composed of a coloring matter film having an average film thickness of 70 nm. Silver was sputtered thereon, so as to form a reflective layer having a thickness of 100 nm. Subsequently, an ultraviolet curing resin was applied by the spin coating method, this was irradiated with an ultraviolet ray so as to cure and form a protective layer having a thickness of 10 μm, and thereby, a so-called CD-R was produced.

A white paint UVSP20404ZTWHITE produced by Teikoku Printing Inks Mfg. Co., Ltd., was printed on the above-described protective layer by a screen printing method. This was irradiated with an ultraviolet ray so as to cure and form a white ink substrate layer having a thickness of 10 μm.

The coating solution A was applied by the spin coating method to the CD-R provided with the above-described white ink substrate layer so as to dispose a coating film. The resulting coating film was dried by being given a temperature of 60° C. so as to form a porous film having a thickness of 25 μm. In this manner, an ink receiving layer in which the white ink substrate layer and the porous film were laminated, was formed on the surface of the protective layer.

The surface of the ink receiving layer of the thus produced optical information recording medium (disk) was printed with water based color inks of four colors, cyan (C), magenta (M), yellow (Y), and black (K), by using an ink-jet printer. FIG. 1 shows the printing pattern. After the water based color inks were fixed and dried adequately by being stood for 24 hours or more, the L*a*b* of the ink printed portion of this disk was measured (L*a*b* value before running water test).

Running water (6 liter/min, 1 minute, 20° C.) was poured on the printed portion of the disk so as to wash out the inks. Furthermore, after the resulting disk was dried adequately, the L*a*b* of the ink printed portion was measured (L*a*b* value after running water test). The color difference between before and after the running water test was calculated on the basis of Calculation formula (a) and Calculation formula (b) described in the paragraph [0018].

Printing was performed by using PMG800 as the printer, the running water test was performed, and the color difference between before and after the running water test was calculated. The results are shown in Table 1.

TABLE 1

|  |  | Cyan (C) | | | Magenta (M) | | | Yellow (Y) | | | Black (K) | | | Value determined by Calculation formula | |
| --- | --- | --- | --- | --- | --- | --- | --- | --- | --- | --- | --- | --- | --- | --- | --- |
|  |  | L* | a* | b* | L* | a* | b* | L* | a* | b* | L* | a* | b* | (a) C M Y K | (b) Total |
| Example 1 | Before running water test | 73.41 | −27.5 | −24.7 | 58.7 | 63.78 | −9.79 | 88.14 | −11.8 | 64.28 | 13.21 | −0.09 | −3.99 | C 1.5 M 2.9 Y 1.1 K 4.8 | 10.4 |
|  | After running water test | 73.83 | −26.4 | −23.8 | 60.01 | 62.37 | −12 | 88.55 | −12.5 | 65.1 | 9.5 | 0.4 | −7 |  |  |
|  | Difference | 0.42 | 1.13 | 0.87 | 1.31 | −1.41 | −2.2 | 0.41 | −0.69 | 0.82 | −3.71 | 0.49 | −3.01 |  |  |

Example 2

A coating solution B was obtained as in Example 1 except that 20-percent by weight nitric acid aqueous solution was changed to 2.0 parts and zirconium oxychloride-octahydrate was not added. The viscosity of the resulting coating solution B was 3,230 mPa·s at 25° C.

The coating solution B was applied by the spin coating method to the CD-R provided with the above-described white ink substrate layer so as to dispose a coating film, as in Example 1. The resulting coating film was dried by being given a temperature of 60° C. so as to form a porous film having a thickness of 25 μm. In this manner, an ink receiving layer, in which the white ink substrate layer and the porous film were laminated, was formed on the surface of the protective layer.

Comparative Example 1

A swelling type printable product was used as the optical information recording medium.

Comparative Example 2

A commercially available glossy swelling type printable product was used as the optical information recording medium.

Comparative Example 3

Another commercially available glossy swelling type printable product was used as the optical information recording medium.

Comparative Example 4

A coating solution C was obtained as in Example 1 except that 20-percent by weight nitric acid aqueous solution and zirconium oxychloride-octahydrate were not added, but the same amount of ion-exchanged water was used. The viscosity of the resulting coating solution C was 3,400 mPa·s at 25° C.

The coating solution C was applied by the spin coating method to the CD-R provided with the above-described white ink substrate layer so as to dispose a coating film, as in Example 1. The resulting coating film was dried by being given a temperature of 60° C. so as to form a porous film having a thickness of 25 μm. In this manner, an ink receiving layer, in which the white ink substrate layer and the porous film were laminated, was formed on the surface of the protective layer.

With respect to Example 2 and Comparative examples 1 to 4, printing was performed by using an ink-jet printer, as in Example 1. In a manner similar to that in the case where PMG800 was used as the printer, the L*a*b* value before running water test and the L*a*b* value after running water test were measured, and the difference was determined. The results are shown in Table 2 together with the results of Example 1 in which other printers were used, and results of a direct contact test, a water droplet dropping test, and a running water test (bleeding).

Figure 5:
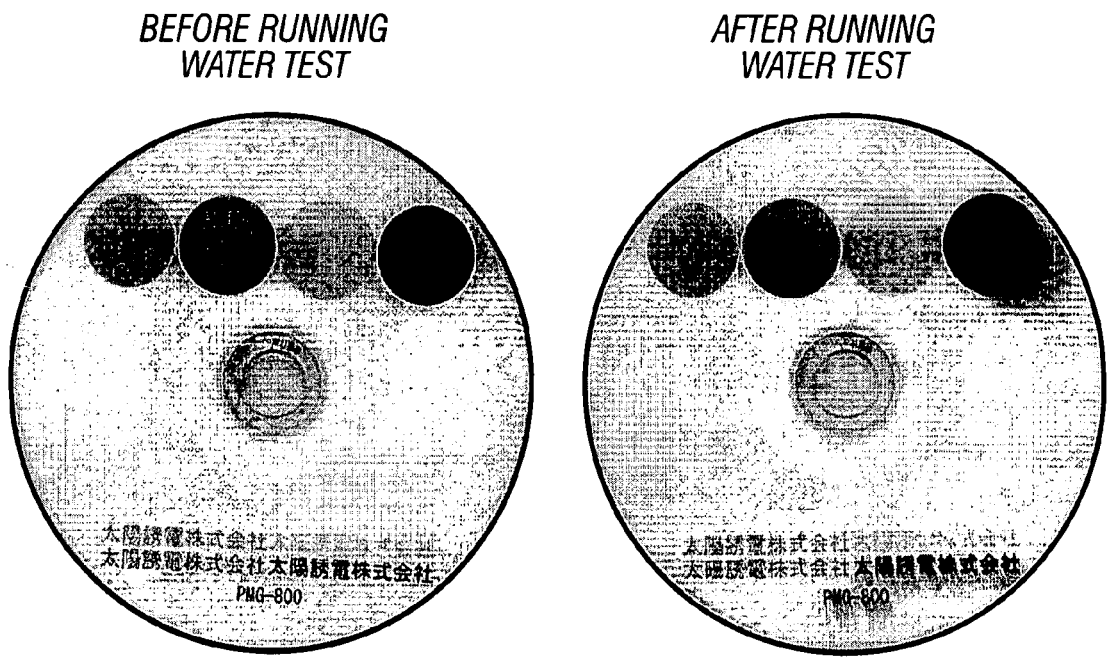
FIG. 5 is a diagram showing the change of a portion, on which the printing has been performed (printer: PMG800), between before and after a running water test in Example 1.
Figure 6:
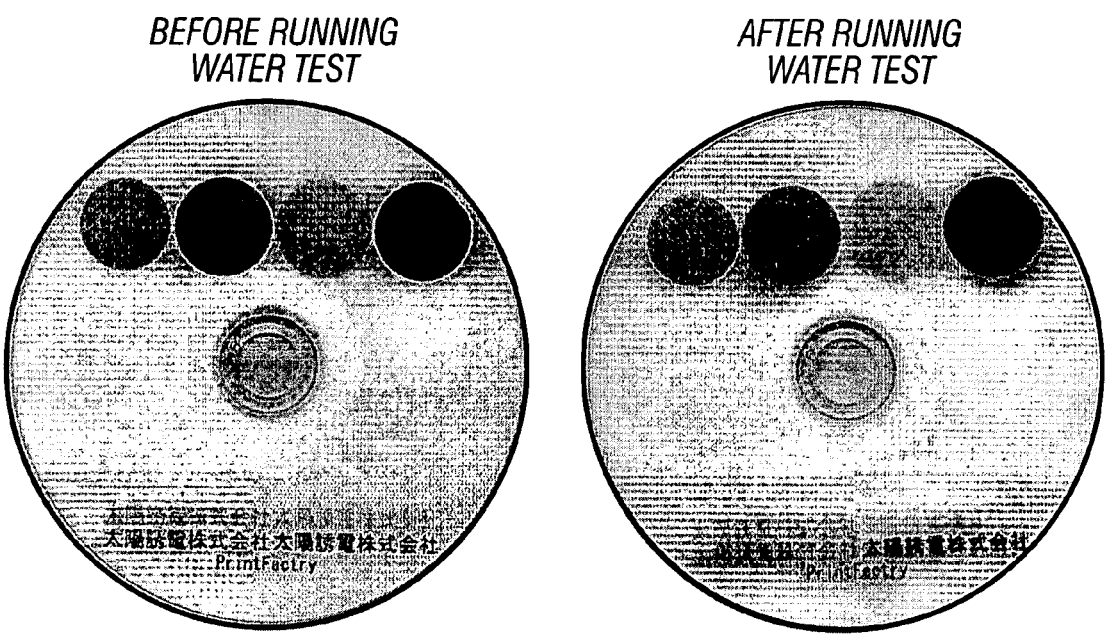
FIG. 6 is a diagram showing the change of a portion, on which the printing has been performed (printer: PrintFactory), between before and after a running water test in Comparative example 1.

FIG. 5 shows the change of the portion, on which the printing has been performed (printer: PMG800), between before and after the running water test in Example 1. FIG. 6 shows the change of the portion, on which the printing has been performed (printer: PrintFactory), between before and after the running water test in Comparative example 1.

The test condition and the evaluation method of the direct contact test were as described below.

Test condition: A high definition image was printed with an ink-jet printer on the ink receiving layer surface. Immediately after the printing, the printed surface portion was rubbed with a wet hand, and a rubbing mark was observed.

Evaluation Method:

⊙=No rubbing mark was observed nor was color fading of the ink observed (a sharp image was maintained)

○=When observed carefully, a slight rubbing mark was found and color fading of the ink was found (when observed carefully, it was found that a part of the rubbed image became blurred)

Δ=A rubbing mark was observed and color fading of the ink was also observed (an image became blurred so as to indicate a rubbing mark)

x=A rubbing mark was observed clearly and color fading of the ink was significant (a rubbed image was left clearly and bleeding was included in the image)

The test condition and the evaluation method of the water droplet dropping test were as described below.

Test condition: A high definition image was printed with an ink-jet printer on the ink receiving layer surface. Immediately after the printing, a water droplet was dropped on the printed surface, and a bleeding mark was observed.

Evaluation Method:

⊙=No bleeding mark was observed (a sharp image was maintained)

○=When observed carefully, a slight bleeding mark was found (the image was slightly blurred)

Δ=A bleeding mark was observed (the image was blurred but an original picture was able to be determined)

x=A bleeding mark was observed clearly (the image became blurred and an original state was unable to distinguish)

The test condition and the evaluation method of the running water test (bleeding) were as described below.

Test condition: The ink receiving layer surface was printed with characters of four colors, C, M, Y, and K, by using an ink-jet printer. After drying was performed adequately by standing for 24 hours or more, running water (6 liter/min, 1 minute, 20° C.) was poured on the printed portion.

Evaluation Method:

⊙=No bleeding mark was observed (sharp characters were maintained)

○=A bleeding mark was observed (the characters were distinguishable)

x=A bleeding mark was observed clearly (it was difficult to distinguish the characters)

TABLE 2

| | | Direct contact test | Water droplet dropping test | Running water test bleeding | Value determined by Calculation formula (a) | | | | Value determined by Calculation formula (b) |
|---|---|---|---|---|---|---|---|---|---|
| | Printer | | | | Cyan | Magenta | Yellow | Black | Total difference |
| Example 1 | a: PMG800 | ⊙ | ⊙ | ○ | 1.5 | 2.9 | 1.1 | 4.8 | 10.4 |
| | b: 990i | ⊙ | ⊙ | ○ | 3.2 | 1.8 | 6.4 | 3.7 | 15.0 |
| | c: Bravo Pro | ⊙ | ○ | ○ | 6.4 | 7.7 | 0.9 | 4.9 | 19.9 |
| | d: Print Factory | ○ | ○ | ○ | 4.9 | 1.9 | 2.6 | 8.7 | 18.1 |
| | e: 480i | ○ | ○ | ○ | 5.2 | 2.5 | 3.1 | 8.7 | 19.5 |
| Example 2 | a | ⊙ | ⊙ | ⊙ | 1.4 | 2.6 | 0.8 | 3.3 | 8.2 |
| | b | ⊙ | ⊙ | ○ | 2.9 | 1.7 | 5.5 | 2.8 | 12.9 |
| | c | ⊙ | ⊙ | ○ | 5.5 | 5.9 | 1.0 | 4.0 | 16.4 |
| | d | ○ | ⊙ | ○ | 4.3 | 1.8 | 2.1 | 5.9 | 14.0 |
| | e | ○ | ⊙ | ○ | 4.4 | 2.2 | 2.7 | 6.4 | 15.8 |
| Comparative example 1 | a | Δ | Δ | ○ | 4.9 | 1.4 | 6.6 | 20.0 | 32.9 |
| | b | Δ | Δ | ○ | 11.1 | 5.5 | 5.7 | 8.5 | 30.8 |
| | c | X | X | X | 4.2 | 20.1 | 3.9 | 15.2 | 43.4 |
| | d | X | X | X | 5.1 | 19.0 | 18.3 | 9.5 | 51.9 |
| | e | X | X | X | 5.0 | 15.6 | 20.7 | 7.6 | 48.9 |

TABLE 2-continued

| | | Printer | Direct contact test | Water droplet dropping test | Running water test bleeding | Value determined by Calculation formula (a) | | | | Value determined by Calculation formula (b) Total difference |
|---|---|---|---|---|---|---|---|---|---|---|
| | | | | | | Cyan | Magenta | Yellow | Black | |
| Comparative example 2 | a | X | X | ○ | 6.3 | 3.9 | 8.6 | 14.8 | 33.6 |
| | b | X | Δ | ○ | 3.5 | 6.5 | 11.9 | 8.7 | 30.5 |
| | c | X | X | X | 8.6 | 11.7 | 4.1 | 8.6 | 33.0 |
| | d | X | X | X | 4.8 | 14.9 | 15.1 | 6.5 | 41.4 |
| | e | X | X | X | 5.0 | 14.3 | 12.5 | 3.1 | 34.9 |
| Comparative example 3 | a | X | Δ | ○ | 2.6 | 2.2 | 5.0 | 10.5 | 20.4 |
| | b | X | Δ | ○ | 1.9 | 7.2 | 6.9 | 5.3 | 21.3 |
| | c | X | Δ | X | 14.1 | 6.7 | 5.1 | 3.9 | 29.8 |
| | d | X | X | X | 4.6 | 15.2 | 15.2 | 4.1 | 39.1 |
| | e | X | Δ | X | 4.2 | 13.1 | 11.2 | 3.1 | 31.6 |
| Comparative example 4 | a | Δ | Δ | ○ | 3.1 | 2.9 | 4.3 | 10.2 | 20.5 |
| | b | Δ | Δ | ○ | 4.2 | 4.2 | 6.7 | 5.3 | 20.4 |
| | c | Δ | Δ | X | 7.3 | 9.5 | 2.8 | 6.7 | 26.3 |
| | d | Δ | Δ | X | 4.7 | 9.6 | 9.7 | 6.3 | 30.3 |
| | e | Δ | Δ | X | 4.8 | 8.7 | 9.1 | 5.3 | 27.9 |

As is clear from Table 2, in Example 1, the difference between before and after the running water test was a small 19.9 at the maximum and, therefore, highly water-resistant print, in which color fading due to running water was hard to occur, was realized. With respect to portions printed with characters, although bleeding of the ink was observed in some combinations (type of printer, type of ink color), the characters were able to be distinguished satisfactorily in all combinations. When a high definition image was printed with an ink-jet printer on an ink receiving layer surface of another optical information recording medium obtained as in the above description, and the print surface portion was rubbed with a wet hand or the like immediately after the printing, color fading of the entire printed image was reduced and good print quality was exhibited. When a water droplet was dropped on the printed portion, air drying was performed, and a manner of bleeding of the color was observed, bleeding or spreading of the color hardly occurred, and the print was maintained satisfactorily.

From these results, it may be said that since the color difference between before and after the running water test was a small 19.9 at the maximum, the ink was fixed to the ink receiving layer so as to become hard to dissolve into water and, thereby, a sharp image exhibiting high durability, high quality, and high reliability was able to be obtained.

As is clear from Table 2, in Example 2, the difference between before and after the running water test was a small 16.4 at the maximum and, therefore, highly water-resistant print, in which color fading due to running water was hard to occur, was realized. With respect to portions printed with characters, although bleeding of the ink was observed in some combinations (type of printer, type of ink color), the characters were able to be distinguished satisfactorily in all combinations. When a high definition image was printed with an ink-jet printer on an ink receiving layer surface of another optical information recording medium obtained as in the above description, and the print surface portion was rubbed with a wet hand or the like immediately after the printing, color fading of the entire printed image was reduced and good print quality was exhibited. When a water droplet was dropped on the printed portion, air drying was performed, and a manner of bleeding of the color was observed, bleeding or spreading of the color hardly occurred, and the print was maintained satisfactorily.

From these results, it may be said that since the color difference between before and after the running water test was a small 16.4 at the maximum, the ink was fixed to the ink receiving layer so as to become hard to dissolve into water and, thereby, a sharp image exhibiting high durability, high quality, and high reliability was able to be obtained.

As is clear from Table 2, in Comparative example 1, the difference between before and after the running water test was a large 51.9 at the maximum and 30.8 even at the minimum. Therefore, the print had low water resistance, and color fading due to running water was easy to occur. With respect to portions printed with characters, bleeding of the ink was observed in most combinations (type of printer, type of ink color), and it was difficult to distinguish the characters. When a high definition image was printed with an ink-jet printer on an ink receiving layer surface of another optical information recording medium obtained as in the above description, and the print surface portion was rubbed with a wet hand or the like immediately after the printing, color fading of the entire printed image was significant and poor print quality was exhibited. When a water droplet was dropped on the printed portion, air drying was performed, and a manner of bleeding of the color was observed, bleeding of the color spread widely, and color fading of the print was significant.

From these results, it may be said that since the color difference between before and after the running water test was a large 51.9 at the maximum and 30.8 even at the minimum, the ink was not appropriately fixed to the ink receiving layer so as to become easy to dissolve into water and, thereby, an image exhibiting the quality with low durability was obtained.

As is clear from Table 2, in Comparative example 2, the difference between before and after the running water test was a large 41.4 at the maximum and 30.5 even at the minimum. Therefore, the print had low water resistance, and color fading due to running water was easy to occur. With respect to portions printed with characters, bleeding of the ink was observed in most combinations (type of printer, type of ink color), and it was difficult to distinguish the characters. When a high definition image was printed with an ink-jet printer on an ink receiving layer surface of another optical information recording medium obtained as in the above description, and the print surface portion was rubbed with a wet hand or the like immediately after the printing, color fading of the entire printed image was significant and poor print quality was exhibited. In some cases in the present example, a phenomenon, in which the film itself was peeled off, was observed. When a water droplet was dropped on the printed portion, air drying was performed, and a manner of bleeding of the color was observed, bleeding of the color spread widely, and color fading of the print was significant.

From these results, it may be said that since the color difference between before and after the running water test was a large 41.4 at the maximum and 30.5 even at the minimum, the ink was not appropriately fixed to the ink receiving layer so as to become easy to dissolve into water and, thereby, an image exhibiting the quality with low durability was obtained.

As is clear from Table 2, in Comparative example 3, the difference between before and after the running water test was a large 39.1 at the maximum and 20.4 even at the minimum. Therefore, the print had low water resistance, and color fading due to running water was easy to occur. With respect to portions printed with characters, bleeding of the ink was observed in most combinations (type of printer, type of ink color), and it was difficult to distinguish the characters. When a high definition image was printed with an ink-jet printer on an ink receiving layer surface of another optical information recording medium obtained as in the above description, and the print surface portion was rubbed with a wet hand or the like immediately after the printing, color fading of the entire printed image was significant and poor print quality was exhibited. In some cases in the present example, a phenomenon, in which the film itself was peeled off, was observed. When a water droplet was dropped on the printed portion, air drying was performed, and a manner of bleeding of the color was observed, bleeding of the color spread widely, and color fading of the print was significant.

From these results, it may be said that since the color difference between before and after the running water test was a large 39.1 at the maximum and 20.4 even at the minimum, the ink was not appropriately fixed to the ink receiving layer so as to become easy to dissolve into water and, thereby, an image exhibiting the quality with low durability was obtained.

As is clear from Table 2, in Comparative example 4, the difference between before and after the running water test was a large 30.3 at the maximum and 20.4 even at the minimum. Therefore, the print had low water resistance, and color fading due to running water was easy to occur. With respect to portions printed with characters, bleeding of the ink was observed in most combinations (type of printer, type of ink color), and it was difficult to distinguish the characters. When a high definition image was printed with an ink-jet printer on an ink receiving layer surface of another optical information recording medium obtained as in the above description, and the print surface portion was rubbed with a wet hand or the like immediately after the printing, color fading of the entire printed image was observed and poor print quality was exhibited. When a water droplet was dropped on the printed portion, air drying was performed, and a manner of bleeding of the color was observed, bleeding of the color spread widely, and color fading of the print was observed.

From these results, it may be said that since the color difference between before and after the running water test was a large 30.3 at the maximum and 20.4 even at the minimum, the ink was not appropriately fixed to the ink receiving layer so as to become easy to dissolve into water and, thereby, an image exhibiting the quality with low durability was obtained.

As described above, it has been made clear that in the case where the color difference between before and after the running water test of the ink receiving layer satisfy the requirement, that is, the total value of the square root of the sum of the square of difference in L*, the square of difference in a*, and the square of difference in b*, each between before and after the running water test, of each of four colors, cyan, magenta, yellow, and black, is 20 or less, excellent print water resistance is exhibited.

In Examples, the ink receiving layer according to an aspect of the present invention has been applied to the CD-R. However, the ink receiving layer may also be applied to optical information recording media compatible with DVD-R, Blue Laser, and the like.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from invention. The scope of the invention is indicated by the appended claims the foregoing description. All changes which come within the meaning and range of equivalency of the claims are to be embraced within their scope.

What is claimed is:

1. An optical information recording medium comprising a porous film ink receiving layer as an outermost layer of a surface opposite to a recording and playback surface, said porous film ink receiving layer having ink adherence properties such that when the ink receiving layer is printed with an ink of each of four colors, cyan, magenta, yellow, and black, followed by drying, a running water test, in which running water is poured on a printed portion at a rate of about 6 liter/min for 1 minute at 20° C., is performed, and L*a*b* values before and after the running water test are measured with a colorimeter, such that the value obtained from formula (b) as below is about 20 or less, $$\text{difference } (X) \text{ between before and after running water test} = \sqrt{((L^*_b - L^*_a) \times (L^*_b - L^*_a) + (a^*_b - a^*_a) \times (a^*_b - a^*_a) + (b^*_b - b^*_a) \times (b^*_b - b^*_a))} \quad (a)$$

$$\text{Calculation formula} = X(\text{Cyan}) + X(\text{Magenta}) + X(\text{Yellow}) + X(\text{Black}) \quad (b),$$

said porous film ink receiving layer being a dried single-solution coating film consisting essentially of a gas phase method inorganic powder, a resin binder, a zirconium compound, nitric acid, and lactic acid.

2. The optical information recording medium according to claim 1, wherein the coating film is formed by a spin coating method.

3. The optical information recording medium according to claim 1, wherein the thickness of the coating film is approximately 5 to 100 μm.

4. The optical information recording medium according to claim 1, wherein the thickness of the coating film is approximately 15 to 50 μm.

5. The optical information recording medium according to claim 1, wherein the particle size of the inorganic powder ranges approximately from 0.005 to 0.2 μm.

6. The optical information recording medium according to claim 1, wherein the coating film is formed by a coating solution comprising a gas phase method inorganic powder with a resin binder in a ratio by mass of approximately 4:1 to 20:1.

7. The optical information recording medium according to claim 1, wherein the coating film is formed by a coating solution of viscosity approximately between 500 to 10,000 mPa·s when measured at 25° C.

8. The optical information recording medium according to claim 1, further comprising a white ink substrate layer formed on the surface of a protective layer of a recording medium main body, wherein the ink receiving layer is formed on top of the white ink substrate layer.

9. A method of making an optical information recording medium of claim 1, the method comprising:
- providing a coating solution consisting essentially of an inorganic powder, an aqueous resin binder, a zirconium compound, nitric acid aqueous solution, and lactic acid;
- spin coating with the coating solution an outermost layer of a surface opposite to a recording and playback surface of the recording medium; and
- drying the outermost layer to form a porous film ink receiving layer, said porous film ink receiving layer having ink adherence properties such that when the ink receiving layer is printed with an ink of each of four colors, cyan, magenta, yellow, and black, followed by drying, a running water test, in which running water is poured on a printed portion at a rate of about 6 liter/min for 1 minute at 20° C., is performed, and L*a*b* values before and after the running water test are measured with a colorimeter, such that the value obtained from formula (b) as below is about 20 or less, $$\text{difference } (X) \text{ between before and after running water test} = \sqrt{((L^*_b - L^*_a) \times (L^*_b - L^*_a) + (a^*_b - a^*_a) \times (a^*_b - a^*_a) + (b^*_b - b^*_a) \times (b^*_b - b^*_a))} \quad (a)$$

$$\text{Calculation formula} = X(\text{Cyan}) + X(\text{Magenta}) + X(\text{Yellow}) + X(\text{Black}) \quad (b).$$

10. The optical information recording medium according to claim 1, wherein the resin binder is selected from the group consisting of polyvinyl alcohol, polyethylene oxide, polyvinyl methyl ether, hydroxyethyl cellulose, and carboxymethyl cellulose.

11. The method according to claim 9, wherein the resin binder is selected from the group consisting of polyvinyl alcohol, polyethylene oxide, polyvinyl methyl ether, hydroxyethyl cellulose, and carboxymethyl cellulose.

* * * * *